United States Patent [19]  [11] Patent Number: 4,826,731
Wagner et al.  [45] Date of Patent: May 2, 1989

[54] DUAL CURED FLUOROPOLYMER LAMINATES

[75] Inventors: Martin G. Wagner; Anestis L. Logothetis, both of Wilmington, Del.

[73] Assignee: E. I. Du Pont De Nemours and Company, Wilmington, Del.

[21] Appl. No.: 49,954

[22] Filed: May 15, 1987

[51] Int. Cl.$^4$ ............... B32B 15/08; B32B 27/06; B32B 27/08
[52] U.S. Cl. .................... 428/422; 428/447; 428/457; 428/463
[58] Field of Search ............ 428/422, 421, 451, 463, 428/447; 526/247, 249

[56] References Cited

U.S. PATENT DOCUMENTS

| | | | |
|---|---|---|---|
| 4,035,565 | 7/1977 | Apotheker et al. | 526/249 |
| 4,529,784 | 7/1985 | Finlay | 526/247 |
| 4,600,651 | 7/1986 | Aufdermarsh et al. | 428/422 |

Primary Examiner—Thomas J. Herbert

[57] ABSTRACT

Fluoroelastomer laminates having one layer of perfluoroelastomer with an ethylenically unsaturated hydrogen or perfluorophenyl and bromo- or iodo- cure site components and compounded with a $K_2AF$ curing system and a second layer of peroxide-curable polymer compounded with a peroxide curing agent. The laminates exhibit excellent high temperature adhesion and oxidative and fluid resistance.

7 Claims, No Drawings

DUAL CURED FLUOROPOLYMER LAMINATES

BACKGROUND OF THE INVENTION

Perfluoroelastomers have long been used in a variety of applications that require excellent resistance to high temperatures and chemical attack. One particularly outstanding fluoropolymer that has been used in elastomeric applications is that prepared from tetrafluoroethylene (TFE) and perfluoro (methyl vinyl) ether (PMVE). To permit the crosslinking in these copolymers that is essential to good elastomeric properties, a small percentage of termonomer is incorporated, as described in Finlay, U.S. Pat. No. 4,529,784 and Apotheker et al., U.S. Pat. No. 4,035,565

While the outstanding thermal and oxidative stability of these perfluoroelastomers has resulted in their use in a wide variety of applications, the same physical properties that provide that stability make it difficult to bond these materials to other surfaces. Improvement in fluoroelastomer laminates was provided by the structures described in Aufdermarsh et al., U.S. Pat. No. 4,600,651. However, continuing effort has been directed to the development of laminates that would provide optimal bonding and performance characteristics.

SUMMARY OF THE INVENTION

The present invention provides a laminate of a perfluoroelastomer which exhibits both excellent adhesion and high temperature performance.

Specifically, the present invention provides a laminate comprising (a) a first layer of a terpolymer of tetrafluoroethylene, a perfluoroalkyl perfluorovinyl ether wherein the alkyl group contains 1 to 5 carbon atoms, and up to about 2 mole percent of units derived from ethylenically unsaturated compounds having (i) hydrogen or perfluorophenyl and (ii) bromo- or iodo- substituents, the units being present in an amount sufficient to provide at least about 0.1 mole percent each of hydrogen or perfluorophenyl and bromine or iodine in the resulting terpolymer, the terpolymer having been compounded with an effective amount of $K_2AF$ curing agent, and (b) a second layer of a polymer selected from at least one peroxide curable elastomer compounded with an effective amount of peroxide curing agent.

DETAILED DESCRIPTION OF THE INVENTION

A basic element of the present invention is a copolymer of tetrafluoroethylene, a perfluoroalkyl perfluorovinyl ether in the which the alkyl group contains from 1 to 5 carbon atoms, and up to about two mole percent of units derived from an ethylenically unsaturated compounds having hydrogen or perfluorophenyl and bromo- or iodo- substituents, the units being present in an amount sufficient to provide at least about 0.1 mole percent of each of hydrogen or perfluorophenyl and bromine or iodine in the resulting terpolymer. The hydrogen or perfluorophenyl and bromine or iodine functionalities can be part of the same ethylenically unsaturated monomer or can be provided by diferent ethylenically unsaturated monomers. These copolymers can be prepared according to the general procedures of Apotheker et al., U.S. Pat. No. 4,035,565, hereby incorporated by reference.

The present invention is based on the discovery that certain of the Apotheker et al. terpolymers, those containing both hydrogen and bromine or iodine in the third monomer, can be effectively cured by either peroxide or $K_2AF$ systems, and that laminates could be prepared that took advantage of the best features of both.

A wide variety of unsaturated compounds can be used for introducing the bromo- or iodo-substituents into the terpolymer. These include, for example, 4-bromo-3,3,4,4-tetrafluorobutene-1, iodo-tetrafluorobutene-1, and perfluorovinyl ethers bearing hydrogen or perfluorophenyl and a bromo- or iodo-substituent. Such monomers are described in greater detail in Uschold, U.S. Pat. No. 4,420,638 and Krespan, U.S Pat. No. 4,531,011, both of which are hereby incorporated by reference. 4-Iodo-3,3,4,4-tetrafluorobutene-1 (ITFB) has been found to be particularly useful in this invention, and is described in U.S. Pat. No. 3,016,407, also hereby incorporated by reference.

The resulting copolymer, containing hydrogen or perfluorophenyl and the bromine or iodine substituents, should contain at least 0.1 mole percent of each type of substituent. The desired curing characteristics are not realized with concentrations of the hydrogen or perfluorophenyl and bromine or iodine at less than this level, and no significant improvement in curing characteristics is realized at concentrations of these moieties of greater than about 2 mole percent.

For the preparation of laminates according to the present invention, the fluoroelastomer is compounded with a curing or vulcanizing agent such as a dipotassium salt of bis-phenol AF($K_2AF$) in combination with a cyclic polyether, such as dicyclohexyl-18-crown-6. Such curing or vulcanizing techniques are described in Brizzolara et al., U.S. Pat. No. 3,682,872, at column 3, lines 19 to 49, which patent is hereby incorporated by reference. The quantity of vulcanizing agent compounded with the fluoroelastomer will vary widely, as will be recognized by those skilled in the art. However, in general, about from 1 to 10 parts of vulcanizing agent per 100 parts of polymer will be used.

The second layer of the present laminates can be prepared from a variety of curable elastomers that will be co-curable with the first layer terpolymer containing the bromine or iodine.

The second layer, for example, can be prepared from fluoroelastomers as described in Apotheker et al., U.S. Pat. No. 4,214,060, hereby incorporated by reference. Fluoroelastomers found to be particularly useful are those prepared from tetrafluoroethylene, hexafluoropropylene, vinylidene fluoride and a bromo- or iodo-cure site monomer. The components can be present in the proportions discussed in the Apotheker et al. patent. However, proportions of 17-27 mole % hexafluoropropylene, 45-60 mole % vinylidene fluoride, 23-35 mole % tetrafluoroethylene and 0.1-1.5 mole % of the bromo- or iodo- cure site monomer have been found to be particularly satisfactory.

Silicone elastomers can also be used for the second layer. Such silicone elastomers can include polydiorganosiloxanes of the types described in detail in Polmanteer, U.S. Pat. No. 4,395,462, hereby incorporated by reference, and are commercially available from Dow Corning Corporation. Such elastomers are further described in Warrick et al., Rubber Chem. and Tech. 52(3) 1979, p. 448 et seq; and Lynch, "Handbook of Silicone Rubber Fabrication," Van Nostrand Reinhold Co., New York 1978, p. 34 et seq.

Copolymers of tetrafluoroethylene and propylene can also be used for the second layer of curable elastomer, and include those described in Brasen et al., U.S. Pat. No. 3,467,635, hereby incorporated by reference. Copolymers of this type are commercially available from Xenox, Inc. as Aflas fluoroelastomers.

The polymer for the second layer is compounded with peroxide curing agent, such as those described in Apotheker et al., U.S. Pat. No. 4,035,565, at Column 6, lines 6-35. The compounding and subsequent curing of the terpolymer can be carried out as described in that patent.

The polymer for each layer can also contain one or more additives known to be useful in fluoropolymer compositions, such as pigments, fillers, pore-forming agents and liquid organic solvents.

The polymers used in each layer of the present laminates are formed into a film according to usual techniques prior to curing. The first terpolymer layer can vary in thickness considerably, depending on the intended use. However, in general, first layers in the present laminates will exhibit a thickness of about from 0.05 to 2.5 mm.

The thickness of a elastomer used for the second layer in the present laminates can also vary widely, but will generally be at least about 0.05 mm. The maximum thickness of the elastomer can vary widely depending on the end use of the laminate, but will generally not exceed 25 mm.

To further improve the final bond characteristics between the first and second layers of the present laminates, each layer can contain up to about 25 weight percent of the polymer from the other layer.

The two layers of the present laminates are bonded together under pressure at elevated temperatures. The temperatures and pressures used will necessarily vary with the particular polymer and the thickness of the layers. However, in general, pressures of about from 0.25 to 15 MPa and temperatures of about from 125° C. to 200° C. are satisfactory. The time for effecting a satisfactory bond between the two layers is about from 1 to 90 minutes. The elevated temperatures and pressures effect a simultaneous bonding and co-curing of the polymers used in the first and second layers.

In a preferred embodiment of the present invention, the first, perfluoroelastomer, layer is precured before lamination to the second layer. This precuring, under usual conditions of elevated heat and/or pressure, improves the overall bond strength of the laminate, as well as the uniformity of the bond and its performance at high temperatures.

The improved laminate performance resulting from the present invention is not fully understood, but is believed to be a function of the dual curability of the fluoroelastomers used. Specifically, precuring, for example, uses the hydrogen or perfluorophenyl bonding sites in the fluoroelastomer in conjuction with the $K_2AF$ curing agent, which results in excellent high temperature and mold release properties. The remaining bromine or iodine bonding sites in the fluoroelastomer remain available for reaction with the peroxy curing agents, providing an excellent bond between the layers of the laminate.

The present laminates can be bonded to a variety of other surfaces. In such composites, the second layer of the present laminate is bonded to the other surface, which can typically be metal or another elastomer. The specific bonding techniques used to form the composite will necessarily vary with the elastomer used for the second layer and the surface to which the present laminate is bonded, as known to those skilled in the art.

Some polymers used to prepare components of the present structures, such as some elastomers, cannot generally be formed into self-supporting structures prior to curing. Accordingly, when preparing laminates according to the present invention, these polymers are typically coated onto a fully cured layer of the same or a compatible polymer.

The laminates of the present invention exhibit, on the surface of the first layer, the outstanding high temperature and solvent resistance characteristic of copolymers of tetrafluoroethylene and perfluoroalkyl perfluorovinyl ether. In addition, by virtue of the known bonding characteristics of the second layer polymers, these materials can be reliably and securely bonded to metal surfaces. Accordingly, the benefits of tetrafluoroethylene/perfluoroalkyl perfluorovinyl ether copolymers can be realized for rolls used in a variety of industrial applications as well as in electrostatic copying equipment, for fluid resistant liners as in bottle cap seals, diaphragms, in flexible tubing and hose and as electrical wire covering.

The dual curability of the first layer of the present laminates results in improved overall performance of the laminate. The curing of the hydrogen or perfluorophenyl sites with the $K_2AF$ systems results in laminates with improved bond strength and elastomeric performance at high temperatures, oxidative resistance, compression set resistance and mold release properties. The curing of the bromine sites with peroxide systems is rapid and results in particularly good resistance to fluids such as steam, acids and bases.

The present invention is illustrated by the following specific examples.

EXAMPLES 1-2 and COMPARATIVE EXAMPLES A-B

Four laminates were prepared on a vulcanized silicone elastomer base. The base was a silicone elastomer filled with iron oxide and alumina. The base was fully cured and post cured. It was about 1.8 mm thick, and cut to about 63.5×114 mm to provide a tight fit in the mold cavity used. It was prepared for subsequent lamination by wiping with methylene chloride.

In each of the four Examples, one layer of the laminate was a peroxide curable, unvulcanized silicone rubber compound, which was sprayed onto the base in the form of a dispersion. This layer represents the second polymer layer as defined in the present invention.

The dispersion used to prepare this layer of the laminate was prepared by mixing, on a two roll rubber mill, 200 g of polydimethylsiloxane with methylvinylsiloxane monomer, (commercially available from Dow Corning as Silastic HE-26), 2 g of Dow Corning Heat Stabilizer Silastic HT-1, 120 g calcined alumina (commercially available as Alcoa A-16-SG), 20 g of a 75/25 paste of red iron oxide in p-dimethylsiloxane (commercially available from Kenrich Petrochemical as Kencolor K-6055), 2 g of triallyl isocyanurate, and 4 g of a 45/55 blend of 2,5-dimethyl-2,5-di(t-butylperoxy)hexane and calcium carbonate (commercially available as Luperco 101-XL).

A sprayable dispersion was produced by ball milling 82.5 g of the above compound with 1.65 g of additional Luperco 101-XL and 616 ml of methylene chloride in a ceramic ball mill with ceramic balls for 18 hours at room temperature. The dispersion was sprayed onto the cured silicone rubber base pieces in each Example. After air drying for 20 hours, the pieces were weighed and found to have about 3.2 g of dried dispersion on each piece.

Layers of copolymer were prepared for the next layer in each Example. In each case, the material was based on a terpolymer of tetrafluoroethylene, perfluoromethyl vinyl ether and bromotetrafluorobutene. Two compounds were prepared using this terpolymer, with a peroxy curing agent and a $K_2AF$ curing agent, respectively. The compounds had the following formulations:

Peroxy compound - 100 parts terpolymer, 10 parts SAF carbon black, 3.0 parts sublimed litharge, 0.3 parts 18-crown-6, 4.0 parts triallylisocyanurate and 5.5 parts Luperco 101-XL.

$K_2AF$ compound—100 parts terpolymer, 10 parts SAF carbon black, 4.0 parts sublimed litharge, 4.0 parts dicyclohexyl-18-crown-6, 3.0 parts dipotassium salt of Bisphenol AF.

Each compound was mixed on a two roll rubber mill and then calendered to a thickness of approximately 0.15 mm. Four samples were then prepared for each Examples 1, 2, A and B, respectively. Each sample was cut to approximately 63.5 × 114 mm. and prepared for lamination as follows:

Sample A—Peroxy compound, wiped with methylene chloride.

Sample B—Peroxy compound, placed in a plunger mold of about the same cavity dimensions between two thin sheets of Kapton polyimide film also cut to size and press cured for 30 minutes at 185° C. The sample was cooled under pressure in the press, removed and the polyimide sheets stripped from the sample, and the sample wiped with methylene chloride.

Sample 1—$K_2AF$ compound prepared as in Sample A.

Sample 2—$K_2AF$ compound prepared as in Sample B.

A small release tab was placed on top of the dried silicone rubber dispersion layer in each Example. Samples 1, 2, A and B were placed on top of the silicone rubber dispersion layer in Examples 1, 2, A and B, respectively. In each of the four Examples, a capping layer of the $K_2AF$ compound, also cut to approximately 63.5 × 114 mm, and wiped with methylene chloride, was placed on top of the assembled layers.

Each of the laminates so assembled was then press cured under pressure in the plunger mold for 30 minutes at 185° C. The laminates were cooled in the press under pressure prior to demolding. Each laminate was then cut in half, and one half subjected to a post cure of 1 hour heating to 150° C., 4 hours at 150° C., 2 hours heating to 200° C., 24 hours at 200° C., followed by cooling to room temperature, all in a nitrogen atmosphere. Each laminate was tested qualitatively by removing the tab and trying to pull it apart at the interface between the middle components. The relative rankings of the laminates, based on the force necessary to initiate failure, are summarized in Table I.

TABLE I

| Example | A | B | 1 | 2 |
|---|---|---|---|---|
| Curing agent | Peroxy | Peroxy | $K_2AF$ | $K_2AF$ |
| Precure | No | Yes | No | Yes |
| Press Cured | Good | Good | Poor | Good |

TABLE I-continued

| Example | A | B | 1 | 2 |
|---|---|---|---|---|
| Post Cured | Good | Excel | Poor | Excel |

Description of qualitative ratings:
Poor - Can be easily peeled apart requiring little force.
Good - Can still be peeled apart due to adhesive failure, but requires considerably more effort than poor samples.
Excellent - Strong pull applied with two hands without separation. Samples were not tested to failure.

The adhesion of the laminate of Control Example A was observed to be slightly degraded by post cure. The laminates of Example 2 and Control Example B, in which one layer was precured, appeared more uniformly adhered across the width of the sample when compared to the laminates of Control Example A and Example 1. The laminate of Control Example A exhibited better adhesion at the edges than in the center of the sample.

The post cured samples were placed in an air environment at 200° C. These samples were checked occasionally by removal from the oven and subsequent hand testing. Over the course of the test, no significant change could be detected. The test lasted 1756 hours of oven exposure. Several times during the course of the test, samples were tested while still hot, as soon as possible after removal from the oven. The precured laminates B and 2 appeared to be just as strong when tested hot as when cooled. By contrast, the laminates of those Examples which were not precured peeled apart with ease when tested hot. The laminates that were not precured would regain their bond strength when allowed to cool back down to room temperature.

The press curing of the perfluoroelastomer before lamination provided stronger, more uniform, and more heat stable bonds than the laminates prepared without prior press curing. However, without the press curing before lamination, the present laminates did not perform as well.

The laminates of Examples 1 and 2 exhibit superior mold release properties on the surface of the copolymer prepared from tetrafluoroethylene, perfluoromethyl vinyl ether, and bromotetrafluorobutene. In addition, the layers of these laminates cured with K2AF will exhibit improved thermal stability when compared to those cured with the peroxide cure systems.

We claim:
1. A laminate comprising
   (a) a first layer of a terpolymer of tetrafluoroethylene, a perfluoroalkyl perfluorovinyl ether wherein the alkyl group contains 1 to 5 carbon atoms, and up to about 2 mole percent of units derived from ethylenically unsaturated compounds having (i) hydrogen or perfluorophenyl and (ii) bromo- or iodisubstituents, the units being present in an amount sufficient to provide at least about 0.1 mole percent each of hydrogen or perfluorophenyl and bromine or iodine in the resulting terpolymer, the terpolymer having been compounded with an effective amount of $K_2AF$ curing agent and substantially free from peroxide curing agent, and
   (b) a second layer of a polymer selected from at least one peroxide curable elastomer compounded with an effective amount of peroxide curing agent.
2. A laminate of claim 1 wherein the layers have been co-cured.
3. A laminate of claim 1 wherein the first layer is precured before lamination to the second layer.
4. A laminate of claim 1 wherein the terpolymer of the first layer is prepared from tetrafluoroethylene, a perfluoroalkyl perfluorovinyl ether and 4-bromo-3,3,4,4-tetrafluorobutene-1.
5. A laminate of claim 1 wherein the second layer is a silicone elastomer.
6. A laminate of claim 1 wherein the second layer is bonded to a metal substrate.
7. A laminate of claim 1 wherein the second layer is bonded to a cured elastomer.

* * * * *